P. GREEN.
FENCE CLAMP.
APPLICATION FILED JAN. 7, 1908. RENEWED JUNE 8, 1909.
930,957.
Patented Aug. 10, 1909.
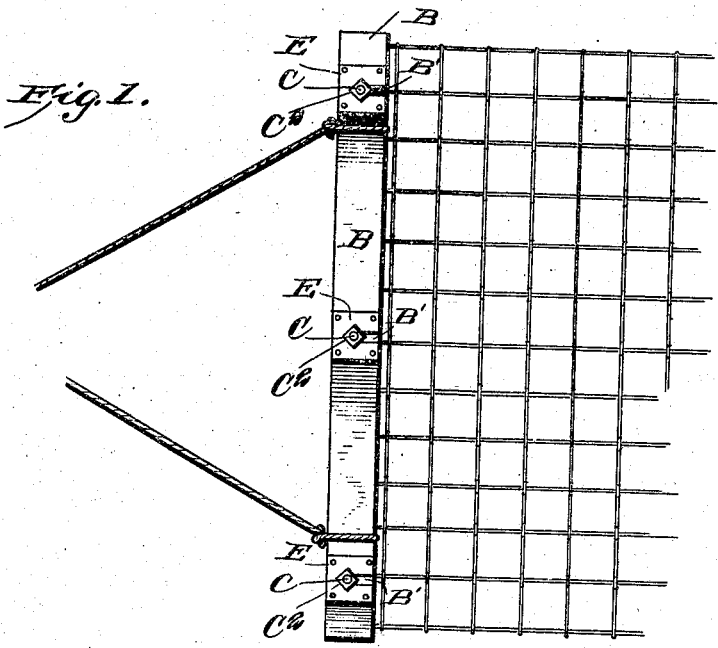
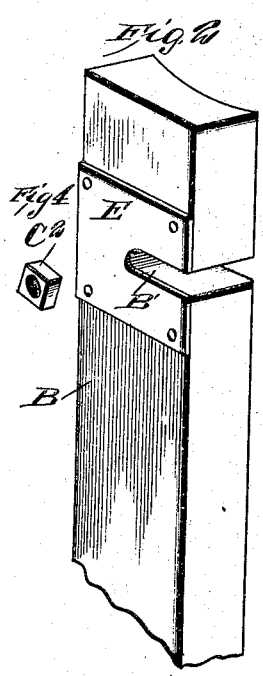
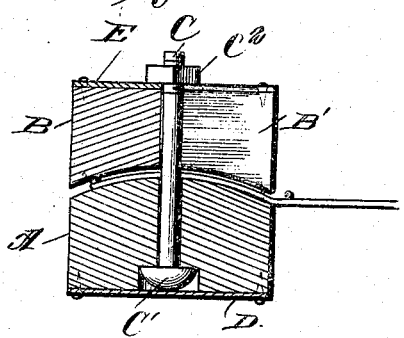
WITNESSES
INVENTOR
PEYTON GREEN
BY
ATTORNEYS

UNITED STATES PATENT OFFICE.

PEYTON GREEN, OF WYTHEVILLE, VIRGINIA.

FENCE-CLAMP.

No. 930,957.     Specification of Letters Patent.     Patented Aug. 10, 1909.

Application filed January 7, 1908, Serial No. 409,641. Renewed June 8, 1909. Serial No. 500,946.

*To all whom it may concern:*

Be it known that I, PEYTON GREEN, a citizen of the United States, and a resident of Wytheville, in the county of Wythe and State of Virginia, have invented certain new and useful Improvements in Fence-Clamps, of which the following is a specification.

This invention is an improvement in fence clamps and relates particularly to the means whereby the lines of the wire of wire fences may be held for connection with the stretching device; and the invention consists in certain novel construction and arrangement of parts as will be hereinafter described and claimed.

In the drawing, Figure 1 is a side elevation illustrating the invention. Figs. 2, 3, and 4 are detail perspective views, and Fig. 5 is a cross section of the clamp as in use.

In stretching wire fences, especially those fences made of fence fabric it is important to provide some means for quickly and securely clamping the fencing, which means is adapted for connection with the stretching device by a rope, as shown in Fig. 1, or in any other suitable manner.

In carrying out my invention I provide a clamp in the form of strips A and B adapted to extend transversely of the fencing on opposite sides thereof, and these sections A and B I shall for convenience of reference denominate the bolt carrying section A, and the slotted section B. The bolt carrying section A may be of wood or other suitable material and is perforated at intervals for the passage of the bolts C. These bolts have their heads C' countersunk in the outer face of the strip A and plates D secured over these countersunk heads operate to retain the bolts in connection with the section or strip A, and also to reinforce those portions of the said strip adjacent to the bolt holes.

The bolts C project from the inner face of the strip A, and extend through the strips B, being received in slots B'. These slots B' are formed from one edge of the strip B, and the said strip B is reinforced at its outer face by plates E, whose edges intersect with those of the slots B' and the said plates form bearings for the nuts C² of the bolts C.

The inner or meeting faces of the strips A and B are formed transversely concavo-convex from edge to edge so that they form a broad curved bearing in which the fencing will be securely clamped when in use by the tightening of the nuts C² of the bolts C.

In practice the plates D and E may be of metal about one sixteenth of an inch thick.

When the strips are fitted on opposite sides of the fencing and tightened together by the nuts on the bolts C the clamp will securely bind the fencing so that the latter may be stretched by any suitable stretching apparatus connected with the clamp.

The construction is simple and by forming the opposing surfaces curved as shown, the wire will be tightly and firmly held, and as the curve prevents slipping, the clamp may be operated efficiently with fewer bolts than in ordinary constructions.

It will be noticed that the bolts are firmly held to the strip A so that they cannot drop out and be lost. By slotting the strip B I am able to avoid the necessity of removing the nuts when it is desired to remove the clamp from the fence, it only being necessary to slacken up the nuts sufficiently to enable the curved section to move laterally out of contact. The plates E reinforce the edges of the slots B' and avoid the necessity of employing separate washers for the nuts C' in the use of the invention. The slotted construction of section B facilitates the application and removal of the clamp and simplifies the construction and operation of the invention.

I claim—

A fence clamp, comprising a bolt section having its inner face curved transversely from side to side, and provided with a series of bolt holes opening through said curved surface, bolts passed through said openings and having their heads countersunk in the outer faces of the said strip, and retaining means secured to the strip and extending over the heads of the bolts, the other ends of the bolts extending beyond the curved inner face of the section, and a slotted section having its inner face curved corresponding to that of the first section and provided with slots extending from its edge and receiving the extended ends of the bolts, and having a reinforcing means on its outer face extending along the edges of the slots, and nuts on the said bolts, all substantially as and for the purpose set forth.

PEYTON GREEN.

Witnesses:
C. K. BECRAFT,
D. A. EWALD.